June 19, 1956  B. RUSSELL  2,751,064
ICE CREAM MACHINE
Filed Oct. 2, 1952  5 Sheets-Sheet 2

Bud Russell
INVENTOR.

June 19, 1956 B. RUSSELL 2,751,064
ICE CREAM MACHINE
Filed Oct. 2, 1952 5 Sheets-Sheet 3

Bud Russell
INVENTOR.

BY
Attorneys

June 19, 1956  B. RUSSELL  2,751,064
ICE CREAM MACHINE
Filed Oct. 2, 1952  5 Sheets-Sheet 4

Bud Russell
INVENTOR.

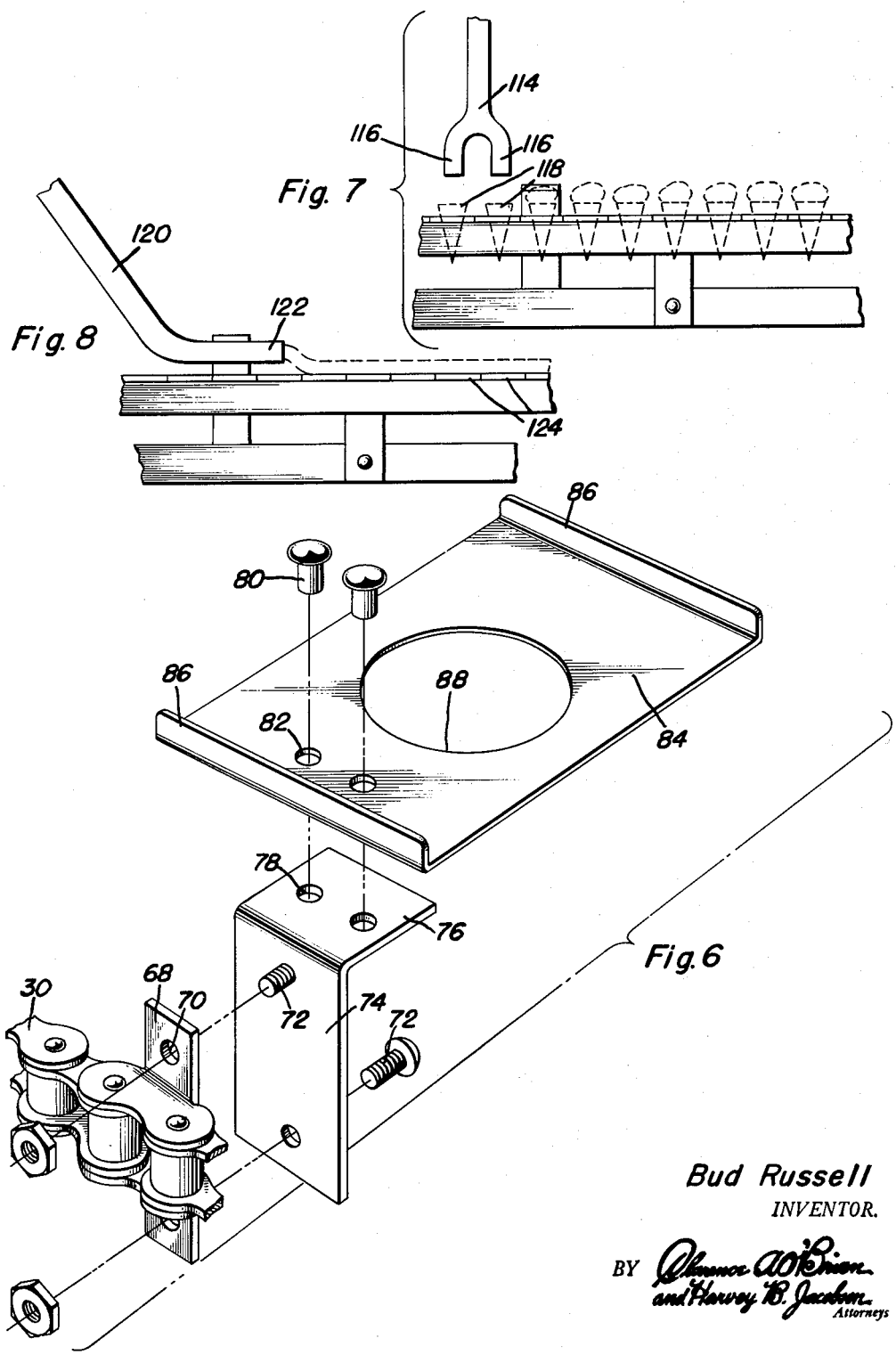

United States Patent Office 2,751,064
Patented June 19, 1956

2,751,064

ICE CREAM MACHINE

Bud Russell, Ardmore, Okla.

Application October 2, 1952, Serial No. 312,688

3 Claims. (Cl. 198—131)

This invention comprises novel and useful improvements in an ice cream machine and more specifically pertains to an apparatus specifically designed for the expeditious handling of frozen confection such as ice cream by passing the same through a freezing chamber.

The principal object of this invention is to provide an improved frozen confection making apparatus which shall be capable of quick and efficient freezing of such confections by passage of the same upon an endless conveyor through a freezing chamber.

A further object of the invention is to provide an apparatus in conformity with the preceding objects which shall be particularly adapted for installation in the freezing compartment of a frozen food locker or the like whereby the refrigerating operation of the commercial frozen food locker may be economically employed as desired for producing frozen confections in an improved and simplified manner.

A further object of the invention is to provide an apparatus in conformity with the foregoing objects which shall have a novel and improved association with a frozen food locker whereby the apparatus may be compactly housed within the freezing compartment of the locker, and may have a portion of the apparatus selectively extended through an access opening in the wall of the locker to provide a confectionery supplying and withdrawing station upon the exterior of the frozen food locker; and wherein the apparatus may be entirely retracted within the frozen food locker for convenience when not in use.

A still further object of the invention is to provide an improved endless conveyor assembly which shall be specifically adapted for use in a frozen food locker and for transporting a variety of confectionery articles in a circulatory manner throughout the freezing chamber of a refrigerating device; wherein the articles may be moved throughout a number of flights of the conveyor and upon different horizontal planes therein.

A further specific object of the invention is to provide a confectionery freezing apparatus in accordance with the above mentioned objects which shall have improved means for selectively extending a portion of the apparatus through an access opening in the wall of the locker and for retracting the same as desired; and wherein the power means for operating the conveyor may be expeditiously and conveniently carried by the frame of the same.

These, together with various and ancillary feature objects of the invention, which will later become apparent as the following description proceeds, are retained by the present invention, a preferred embodiment of which has been illustrated, by way of example only, in the accompanying drawings, wherein:

Figure 6 is a fragmentary exploded perspective view of a portion of the conveyor chain and of a confectionery holder and a bracket for mounting the same on the chain;

Figure 7 is a fragmentary elevational view showing a means for loading ice cream cones with ice cream at an inlet station of the conveyor; and, Figure 8 is a view similar to Figure 7 but showing a means for applying a layer of ice cream to cake wafers carried by confectionery article holders on the conveyor chain of the apparatus.

Figure 1:
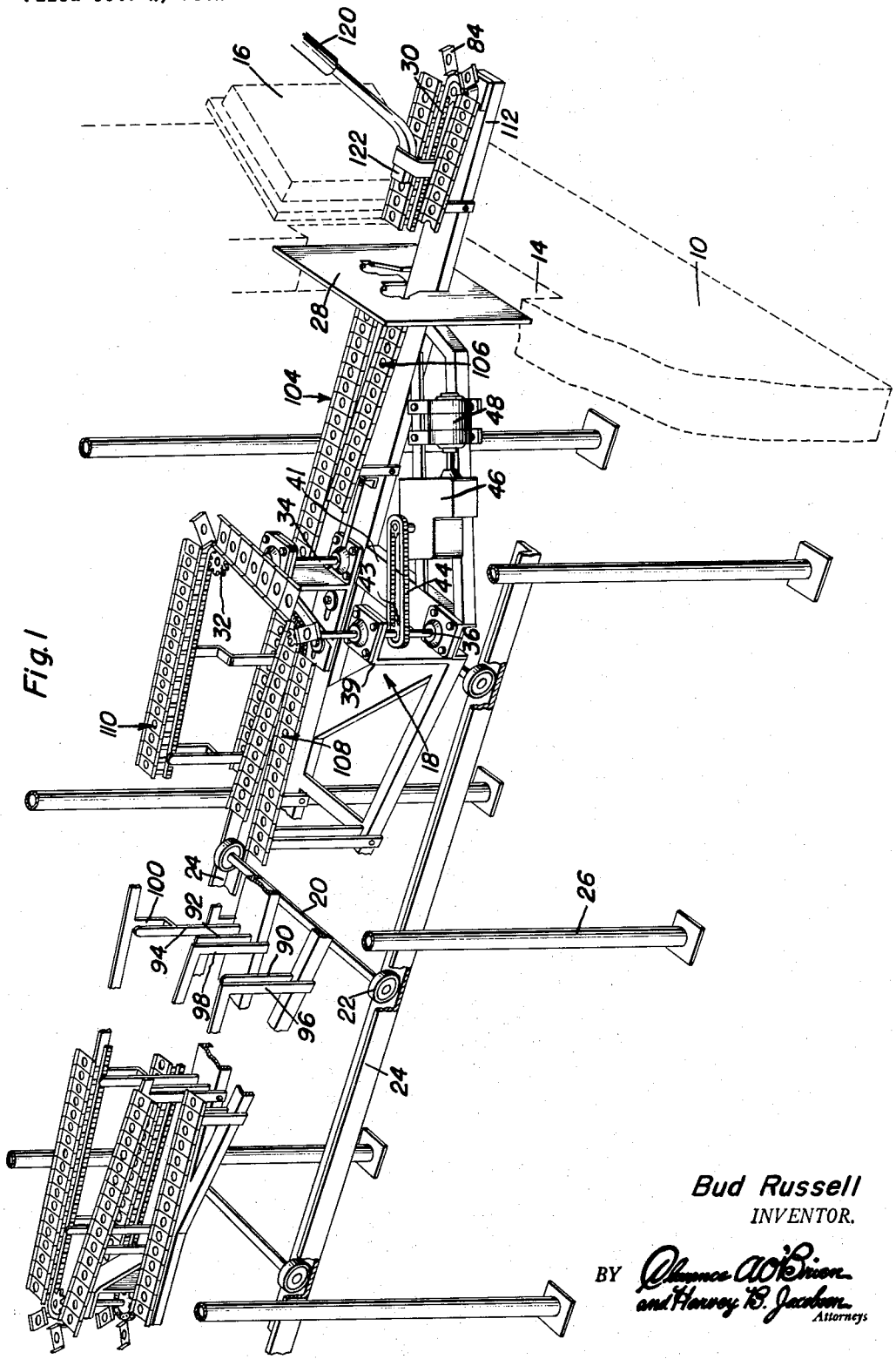
Figure 1 is a fragmentary perspective view showing portions of a preferred embodiment of apparatus in accordance with this invention, the same being indicated as mounted within the freezing chamber of a frozen food locker, a portion of the wall of which has an access opening in the wall which may be indicated by the dotted lines in this figure.

Reference is now made more specifically to the accompanying drawings, where like numerals designate similar parts throughout the various views. The numeral 10 designates the portion of a wall of a frozen food locker having a freezing compartment 12 therein, the wall having an access opening 14 which may be conveniently closed as by a door or the like 16. The present invention is particularly adapted for use in known and conventional types of frozen food lockers, to provide thereby and therein a confectionery freezing apparatus, to thus provide additional utility for the refrigerating compartment of a frozen food locker by utilizing the same as a means for freezing ice cream cones or ice cream sandwiches. The apparatus is housed entirely within the freezing compartment 12 of the locker but is movably supported therein whereby an end portion of the apparatus may be extended through the access opening 14 to the exterior of the locker to provide a confectionery applying and a confectionery removing station from the endless conveyor forming an essential part of the apparatus.

The apparatus disclosed herein consists essentially of a conveying assembly for moving a series of confectionery objects throughout a torturous path and upon a plurality of planes during the passage of the confectionery articles through the freezing chamber of the locker. The conveying assembly includes a suitable support or supporting assembly and frame denoted generally by the numeral 18 and which is provided with a plurality of supporting axles 20 having supporting rollers 22 thereon which may have anti-friction bearings or the like if desired. The support 18 in turn is movably mounted by the rollers 22 upon a framework whereby the assembly may be moved towards and from the wall 10 and the access opening 14. This frame preferably consists of a pair of angle iron track members 24 upon which the rollers 22 are supported, the track members in turn being supported by suitable standards 26 resting upon the floor of the freezing compartment in any desired manner. The frame consisting of the tracks 24 and standards 26 with any desired bracing members is intended to be mounted in a stationary fashion in the compartment 12 of the freezing locker in a position whereby the support 18 will be mounted for movement towards and from the access opening 14, whereby the conveyor assembly may be entirely retracted within the locker and the access door 16 closed; or whereby the assembly may be extended through the access opening 14 as illustrated in Figures 1 and 2 when the device is to be placed in operation.

If desired, a shield or closure plate 28 may be applied to the access opening 14 in order to mask and diminish the extent of the opening and provides merely sufficient clearance for the necessary elements of the conveyor assembly to extend therethrough during operation of the assembly as set forth hereinafter.

The conveyor assembly consists of an endless conveyor in the form of a chain which may be of the sprocket chain type, this chain being indicated in general by the numeral 30 and being supported by suitable sprocket wheels 32 mounted upon vertical shafts 34 appropriately carried by the support member 18.

Figure 2:
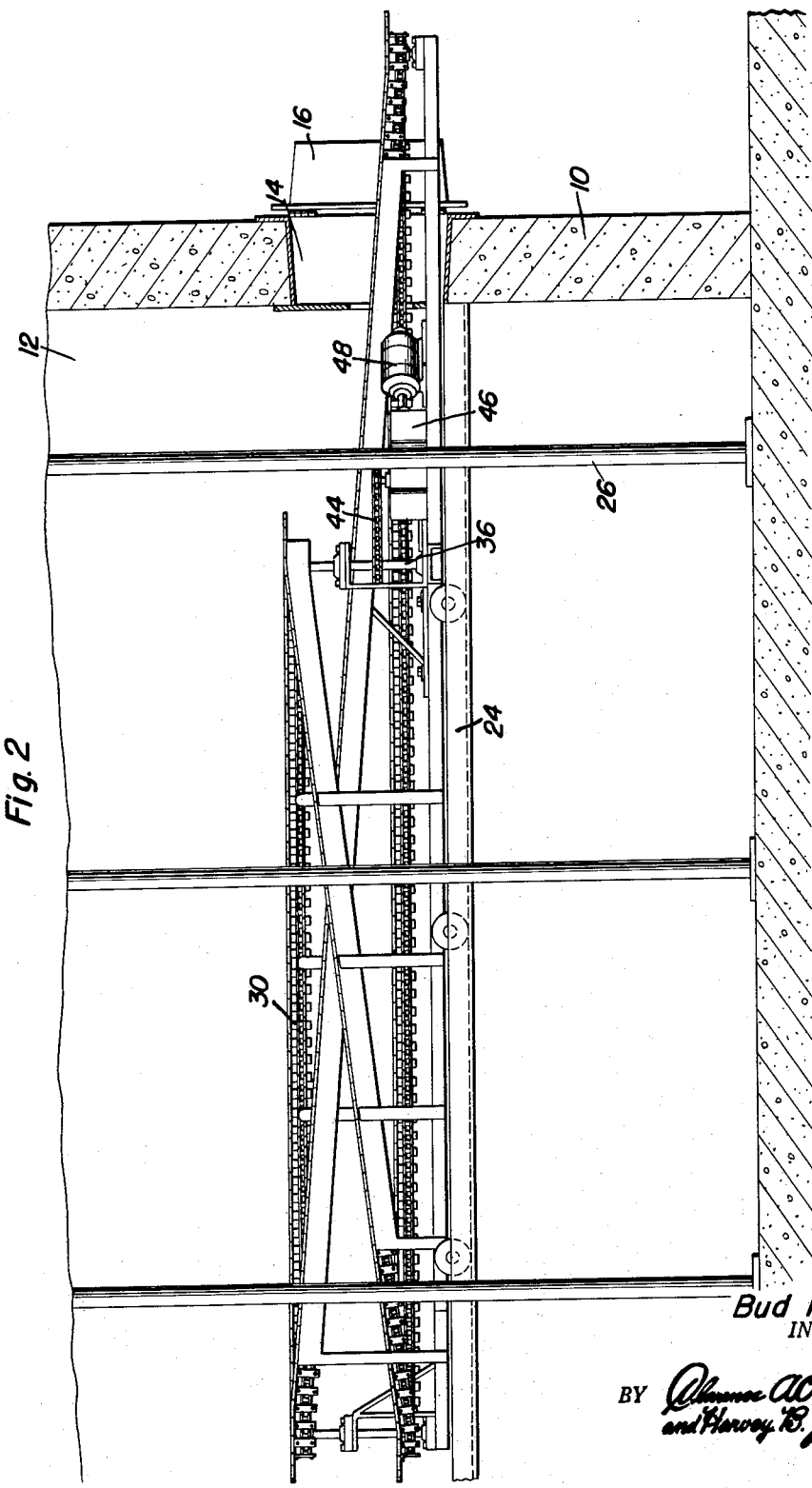
Figure 2 is a side elevational view of the apparatus of Figure 1.

A driving sprocket axle 36 is provided, see Figure 1, which is journaled in a suitable bracket member 39 carried by a transverse channel member 40 forming a part of the support 18. Between the vertically spaced journal bearings, the driving sprocket shaft 36 is provided with a driving sprocket 43 which is connected by a sprocket chain 44 with a reduction gearing assembly 46 which in turn is driven by a suitable source of power such as an electric motor 48. The latter, as shown in Figure 1 is mounted upon a part of the support 18 and is thus carried by and is movable with the conveying assembly. Suitable controls are provided by the electric motor 48, whereby the operation of the conveyor may be regulated as desired, but since such control means form no part of the present invention, illustration and further explanation of the same is deemed to be unnecessary.

Figure 4:
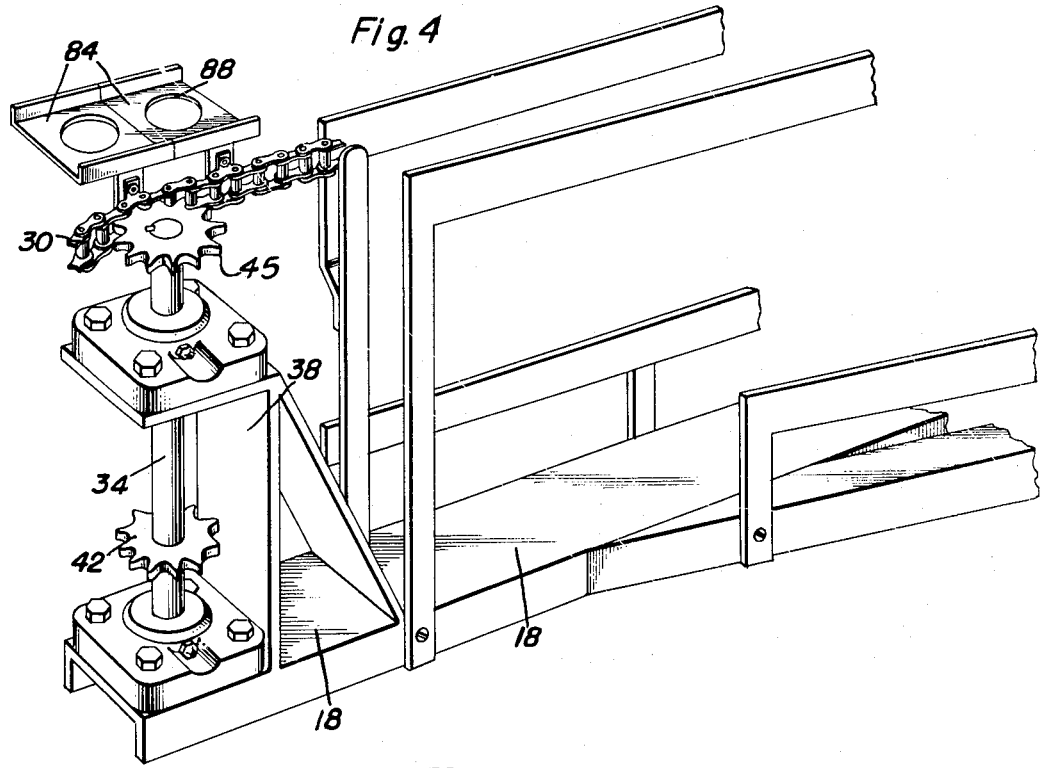
Figure 4 is a fragmentary perspective view of the further portion of the apparatus showing the manner in which the endless conveyor chain is entrained over an idler pulley of the apparatus.

One idler sprocket axle 34 is provided, see Fig. 4, at a further end of the elongated channel iron support member 18, which is vertically journalled by suitable bearings in a bracket member 38. Between the vertically spaced journal bearings the idler shaft 34 is provided with a rigid axially connected sprocket 42. Adjacent its uppermost end and above the topmost bearing the idler axle is provided with another sprocket 45, similar to the sprocket 42, and over which a fragment of the chain 20 is shown entrained.

Figure 5:
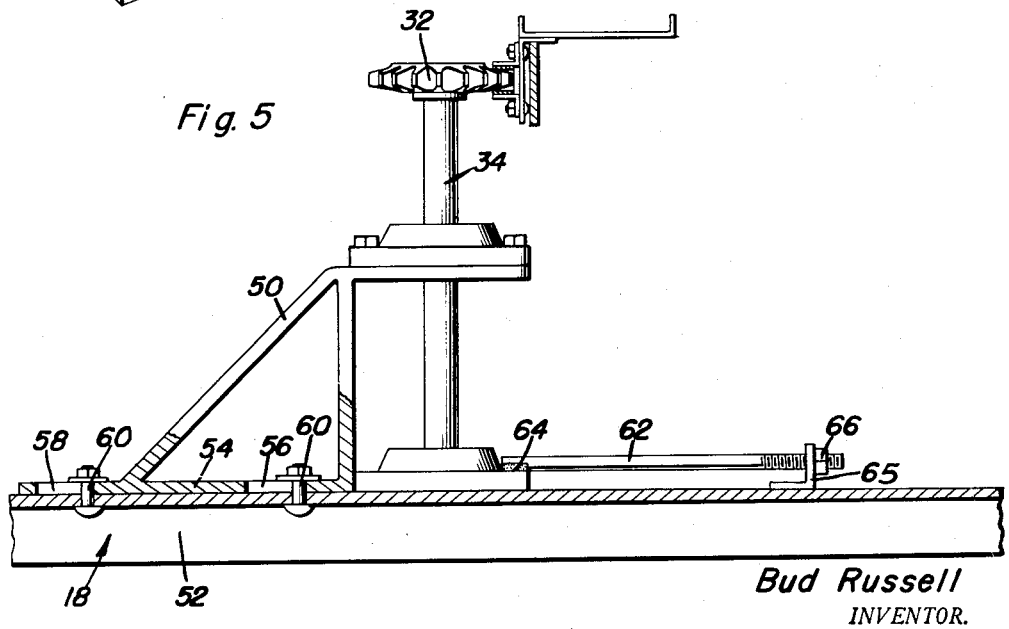
Figure 5 is a vertical transverse sectional detail view of another portion of the apparatus, showing the manner in which an idler sprocket is adjustable for varying the tension of the conveyer chain.

One of the idler or guide sprocket axles 34, as shown in Figures 1, 4 and 5, is mounted on the support member 18 adjacent its juncture with the transverse channel member 41 for longitudinal movement relative to the elongated support 18 whereby tension of the sprocket chain may be adjusted. For this purpose, the axle 34 having the guide or idler sprocket 32 thereon is journaled in a movable supporting bracket assembly 50 which is in turn movably supported by the longitudinally extending component mean 52 of the support 18. Thus, the foot or base plate 54 of the bracket 50 is provided with a pair of adjusting slots 56 and 58 therein, through which extend fastening bolts 60 carried by the member 52. An adjusting rod 62 is welded as at 64 or is otherwise suitably secured to the bracket assembly and extends through a lug 65 stationarily mounted upon the member 52. By means of an adjusting nut 66, applied to the rod 62, the bracket assembly may be moved longitudinally of the member 52 to thereby vary the slack and tension of the sprocket chain. If desired, additional chain tensioning and adjusting members similar to that previously described may be utilized.

A novel and improved construction of confectionery article holder is mounted upon the conveyor chain 30. Thus, as shown in Figure 6, selected links of the sprocket chain 30 are formed with vertically extending mounting plates 68 thereon, which are apertured as at 70 for the reception of fastening members 72 whereby the vertical plate 74 of an angle shaped bracket may be removably secured to the sprocket chain. This bracket as said before has a horizontal angular portion 76 which is apertured as at 78 for the reception of rivets or other fastening members 80. The rivets extend through apertures 82 in a tray or plate 84 whereby the latter is secured to the horizontal portion 76 of the bracket. The tray or plate 84 is preferably flat, having a pair of upturned end flanges 86 and a central aperture 88 therein.

The tray 84 is of such size that an edible cake or sandwich wafer may be placed and retained thereon between the flanges 86, or alternatively an ice cream cone may be inserted through the aperture 88, both of these utilizations of the holder being indicated in the drawings. The single type of holder therefore serves for two types of confectionery articles for supporting the same through the freezing chamber to thereby freeze the confectionery article.

Figure 3:
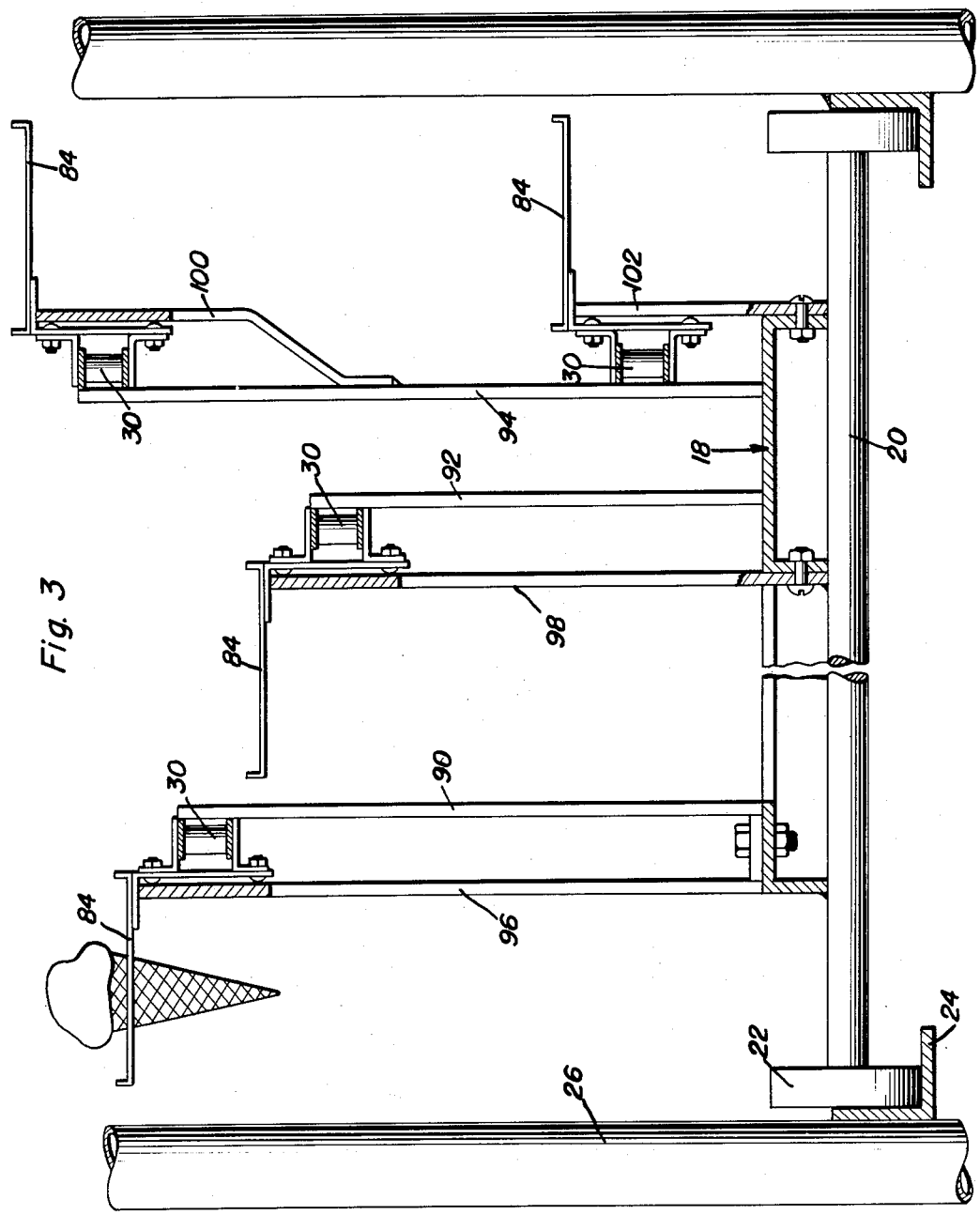
Figure 3 is a vertical transverse sectional detail view, parts being broken away, through a portion of the apparatus showing the supporting and mounting means for the same.

The flights of the conveyor chain are supported at different elevations and are guided along their length whereby a confectionery holder on the chain is caused to move through a tortuous path through a number of turns in the freezing compartment; and is caused to travel in a plurality of planes therein. For this purpose, a combined support and guide means is provided for the conveyor chain and the holders carried thereby. This combined means, as shown more clearly in Figure 3, comprises a plurality of vertically extending guide members of brackets 90, 92 and 94, against the upper sides of which the links of the endless chain are adapted to slide in guided engagement. The brackets or members 90, 92 and 94 are different heights in order to permit the flights of the chain to be vertically spaced as desired.

A set of combined supporting and guide members 96, 98, 100 and 102 are likewise provided for engagement by the opposite sides of the links of the sprocket chain and are provided with upper edges or surfaces which constitute bearing and support surfaces upon which the undersides of the trays or plates 84 slidingly rest. It will be seen that this last mentioned group of elements serves to support the different flights of the chain at different vertical heights in order to cause the holders to move in different horizontal planes as desired.

By this means, it shall be apparent from Figures 1 and 2, the endless conveyor chain has what may be termed an inlet flight 104 and an outlet flight 106 disposed in side by side relation therewith, and which are adapted to extend through the access opening as desired. The flight 104 moves in the same horizontal plane to the end of the apparatus, and then passing about a guide sprocket moves forwardly and upwardly to the rising flight indicated generally by the numeral 108 to the upper plane through which the conveyor passes and then passes about a pair of guide sprockets as shown in Figure 1. In this upper plane, after passing the guided pulleys, the flight 108 assumes the position indicated by the numeral 110, then passes about the idler pulley at the rear of the machine, and from thence drops downwardly until it becomes the discharge flight 106. At the outer extremities, flights 106 and 104 are entrained over a guide sprocket mounted upon a projecting portion 112 which thus constitutes a confectionery applying and removing station.

As shown more particularly in Figures 7 and 8, an applying means in the form of a conduit 114 from the discharge chamber of a continuous ice-cream freezer, not shown, having any desired number of discharge nozzles 116 is provided for dispensing the ice-cream to edible containers such as ice cream cones indicated at 118 and carried by the trays 84 on the conveyor chain prior to the passage of these trays from the inlet station through the access opening and into the freezing compartment.

Alternatively, a conduit 120 from the discharge chamber of a continuous ice-cream freezer, not shown, having a nozzle 122 appropriately provided whereby the ice-cream may be deposited as a flat film upon edible wafers or cakes 124 which are placed upon the trays 84.

It will thus be readily seen that the apparatus enables the use of a conventional refrigerating compartment of a frozen food locker to be utilized as a means for producing frozen confections of either cones or sandwiches filled with ice-cream drawn from the continuous freezer at 24 to 25 degrees F. thus eliminating the necessity of pre-hardening in the production process and insuring the production of a uniform product. The complete cycle of the trays on the endless chain takes approximately 12 to 16 minutes and the temperature in the refrigerated compartment is maintained at 15 to 20 degrees below zero so that the ice-cream is hard enough to permit the dipping of the cones into hot chocolate if desired and rolling in cracked nuts before packaging. The top wafer is placed on the sandwich as it emerges from the refrigerated compartment after the ice-cream has been frozen which saves approximately six minutes of freezing time.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A confection conveyor, comprising: a horizontally disposed elongated channel-iron support, said support having a transversely extending projection intermediate its ends; a guide sprocket rotatably mounted horizontally adjacent one end of said elongated support in superposed relation with said support; a pair of superposed idler sprockets rotatably mounted in spaced-apart relation above the end of said support and opposite said first mentioned end; a pair of driver sprockets rotatably mounted in spaced-apart superposed relation above the outermost end of said transverse projection; a single idler sprocket rotatably mounted in spaced relation above said elongated support adjacent its juncture with said transverse projection, the last mentioned sprocket being selectively movable longitudinally relative to said elongated support; a motor carried by said support; a sprocket chain drivably connecting said motor with the lowermost said driver sprocket; a bracketed endless conveyor chain entrained over said uppermost driver sprocket and said guide and idler sprockets forming a plurality of flights, said flights comprising an inlet flight extending longitudinally with relation to said support and in substantial horizontal parallel relation with said support between said guide sprocket and the said lowermost one of said pair of idler sprockets, and a rising flight extending between said lowermost idler sprocket and said uppermost driver sprocket, and an upper flight extending substantially horizontally and in parallel relation with said support between said uppermost driver sprocket and the uppermost one of said pair of idler sprockets, said upper flight being entrained over said single idler sprocket, and an outlet flight extending between said uppermost one of said pair of idler sprockets and said guide sprocket; a plurality of vertically extending guide members carried by said support for guiding and supporting the said flights of said chain; and a plurality of laterally extending juxtaposed upwardly open trays rigidly carried by said endless chain, and whereby said motor rotates the lowermost said driver sprocket thereby continuously moving said endless chain and said trays throughout said flights.

2. A confection conveyor, comprising: a horizontally disposed elongated channel-iron support, said support having a transversely extending projection intermediate its ends; a plurality of transverse axles rigidly carried by the lower edge of said support; a roller axially connected to each end, respectively, of said axles for longitudinal movement of said support; a guide sprocket rotatably mounted adjacent one end of said support in superposed relation therewith; a pair of superposed idler sprockets rotatably mounted in spaced-apart relation above the end of said support opposite the first mentioned end, and having the lowermost said idler sprocket disposed in substantially the same plane with relation to said guide sprocket; a pair of driver sprockets rotatably mounted in spaced-apart relation above the outermost end of said transverse projection, the spacing of said driver sprockets being such that said lowermost driver sprocket is disposed in a plane slightly above the plane of the lowermost one of said pair of idler sprockets, and having the uppermost said driver sprocket disposed in substantially the same horizontal plane as the uppermost one of said pair of idler sprockets; a single idler sprocket rotatably mounted in spaced relation above said elongated support adjacent its juncture with said transverse projection, said single idler sprocket being horizontally disposed in substantially the same plane with relation to said uppermost driver sprocket, said single idler sprocket being selectively movable longitudinally with relation to said elongated support; a motor carried by said support; a sprocket chain drivably connecting said motor with the lowermost said driver sprocket; a bracketed endless conveyor chain entrained over said uppermost driver sprocket and with said guide and idler sprockets forming a plurality of flights, said flights comprising, an inlet flight extending longitudinally horizontal in substantially parallel relation with said support between said guide sprocket and the said lowermost one of said pair of idler sprockets, and a rising flight extending between said lowermost idler sprocket and said uppermost driver sprocket, and an upper flight extending substantially horizontally and in parallel relation with said support between said uppermost driver sprocket and the uppermost one of said pair of idler sprockets, said upper flight being entrained over said single idler sprocket, and an outlet flight extending between said uppermost one of said pair of idler sprockets and said guide sprocket; a plurality of vertically extending guide members carried by said support for guiding and supporting said chain through said flights of said chain; and a plurality of laterally extending juxtaposed upwardly open trays carried by said chain, whereby said motor rotates the lowermost said driver sprocket and thereby continuously moving said endless chain and said trays throughout said flights.

3. A confection conveyor, comprising: a horizontally disposed elongated channel-iron support, said support having a transversely extending projection intermediate its ends; a vertically disposed guide axle rotatably mounted on said support adjacent one of its ends; a guide sprocket rigidly connected axially to said guide axle in horizontal spaced relation above said support; a vertically disposed first idler axle rotatably mounted on said support adjacent the end opposite the first mentioned end; a pair of superposed idler sprockets rigidly connected axially in spaced-apart relation to said idler axle, said lower idler sprocket lying in substantially the same horizontal plane relative to said guide sprocket; a vertically disposed second idler axle rotatably mounted on said support adjacent its juncture with said transversely extending projection, said second idler axle being selectively movable longitudinally with relation to said support; a single idler sprocket rigidly connected axially to said second idler axle in substantially the same horizontal plane relative to the uppermost one of said pair of idler sprockets; a driver axle rotatably mounted adjacent the end of said transversely extending projection; a pair of driver sprockets rigidly connected axially in spaced-apart relation to said driver axle, the uppermost said driver sprocket lying in the same horizontal plane with relation to the said single idler sprocket; a motor carried by said support adjacent said driver axle; a sprocket chain drivably connecting said motor with the lowermost said driver sprocket; a bracketed endless conveyor chain entrained over said uppermost driver sprocket and said guide and idler sprockets defining a plurality of flights, said flights comprising, a horizontal inlet flight extending longitudinally in parallel relation with said support between said guide sprocket and the lowermost one of said pair of idler sprockets, and a rising flight extending from said driver sprocket, and a transverse horizontal flight extending parallel with relation to said transversely extending projection in spaced relation above said inlet flight between said uppermost driver sprocket and said single idler sprocket, and a longitudinal horizontal flight extending in spaced substantially parallel relation above said inlet flight between said single idler sprocket and the uppermost one of said pair of idler sprockets, and a declining outlet flight extending from the uppermost one of said pair of idler sprockets below said transverse flight to said guide sprocket; a plurality of vertically extending guide members carried by said support for guiding and supporting the flights of said chain; and a plurality of laterally extending juxtaposed upwardly open trays carried by said chain, whereby said motor rotates the lowermost said driver sprocket thereby continuously moving said endless chain and said trays throughout said flights.

References Cited in the file of this patent

UNITED STATES PATENTS

| | | |
|---|---|---|
| 1,297,569 | Johnson | Mar. 18, 1919 |
| 1,334,025 | Embry | Mar. 16, 1920 |
| 1,686,533 | Ronning | Oct. 9, 1928 |
| 1,827,134 | Becker | Oct. 13, 1931 |
| 1,839,731 | Baum | Jan. 5, 1932 |
| 1,871,089 | Shafer | Aug. 9, 1932 |
| 1,992,861 | Demos | Feb. 26, 1935 |
| 2,074,278 | Shapiro | Mar. 16, 1937 |
| 2,188,418 | Rauth | Jan. 30, 1940 |
| 2,282,525 | Maguire | May 12, 1942 |